United States Patent
Lee

(10) Patent No.: US 9,739,047 B2
(45) Date of Patent: Aug. 22, 2017

(54) NON-POINT POLLUTANT SOURCE TREATMENT APPARATUS

(71) Applicant: Ji Seung Development, Anyang (KR)

(72) Inventor: Soon Bok Lee, Siheung (KR)

( * ) Notice: Subject to any disclaimer, the term of this patent is extended or adjusted under 35 U.S.C. 154(b) by 560 days.

(21) Appl. No.: 14/516,488

(22) Filed: Oct. 16, 2014

(65) Prior Publication Data
US 2016/0083952 A1    Mar. 24, 2016

(30) Foreign Application Priority Data
Sep. 19, 2014   (KR) .......................... 10-2014-0124702

(51) Int. Cl.
| | |
|---|---|
| E03F 5/14 | (2006.01) |
| B01D 36/04 | (2006.01) |
| E03F 5/04 | (2006.01) |
| B01D 17/02 | (2006.01) |

(52) U.S. Cl.
CPC .............. *E03F 5/14* (2013.01); *B01D 36/04* (2013.01); *E03F 5/0401* (2013.01); *E03F 5/0404* (2013.01); *B01D 17/0202* (2013.01)

(58) Field of Classification Search
None
See application file for complete search history.

(56) References Cited

U.S. PATENT DOCUMENTS 7,294,256 B2 * 11/2007  Happel ............... E03F 5/14
                                               210/155

FOREIGN PATENT DOCUMENTS

| KR | 10-0834352 | * | 6/2008 |
| KR | 10-2014-0043427 A | | 4/2014 |
| KR | 10-1389570 B1 | | 4/2014 |

* cited by examiner

*Primary Examiner* — Thomas M Lithgow
(74) *Attorney, Agent, or Firm* — Patent Office of Dr. Chung Park

(57) ABSTRACT

Provided is a non-point pollutant source treatment apparatus. The non-point pollutant source treatment apparatus includes an inlet pipe for allowing initial polluted rain (raw) water to flow therethrough, a settling tank coupled to the inlet pipe and storing raw water flowing from the inlet pipe, a drain part disposed at one side of an inside of the settling tank directly under the inlet pipe, and coupled to a drain pipe so as to discharge raw water contained in the settling tank into the outlet pipe, a purifying member disposed at the other side of the settling tank and including purifying plates with inlet holes, a filtering part coupled to an upper portion of the settling tank and filtering foreign substances from raw water, and a backwashing tank coupled to an upper portion of the filtering part and including a purified water pipe.

12 Claims, 11 Drawing Sheets

US 9,739,047 B2

NON-POINT POLLUTANT SOURCE TREATMENT APPARATUS

CROSS-REFERENCE TO RELATED APPLICATIONS

This U.S. non-provisional patent application claims priority under 35 U.S.C. §119 of Korean Patent Application No. 10-2014-0124702, filed on Sep. 19, 2014, the entire contents of which are hereby incorporated by reference.

BACKGROUND OF THE INVENTION

The present invention disclosed herein relates to a non-point pollutant source treatment apparatus, and more particularly, to a non-point pollutant source treatment apparatus which is connected to inlet pipes of bridges, underground roadways, and roads, and filters and discharges rain water including pollutants emitted from vehicles and materials deposited on roads for a long time to prevent rivers from being contaminated.

Initial polluted rain water (hereinafter, referred to as 'raw water') in which various materials deposited on bridges, underground roadways and roads, and pollutants generated from vehicles or nature are mixed with rain water flows into rivers, contaminating the rivers, thus disturbing the ecosystem, and furthermore acting as a main cause that contaminates sea.

Particularly, bridges, which are constructed over rivers or other structures obstructing traffic to enable vehicles to pass through, include piers vertically installed at certain intervals. Also, a plurality of decks are connected to each other over the piers. In this case, collecting wells and collecting pipes thereunder are installed in the bridges to discharge rain water. Thus, rain water is discharged out of a lower part of the bridge through the collecting wells and the inlet pipes such that water is not collected on the deck.

Such a typical collecting well has only a simple effect of removing foreign substances having a large volume. Accordingly, initial raw water in which pollutants generated from vehicles or nature are mixed with rain water may flow into rivers, contaminating the rivers, disturbing the ecosystem, and furthermore contaminating sea.

In order to overcome these limitations, endeavors to complement the structure of the collecting well are being conducted, but actual results are not being produced.

PRIOR ART

Patent Documents

Document 1. Korean Patent Application Publication No. 10-2014-0043427, Korean Intellectual Property Office, entitled "point pollutant source and non-point pollutant source eco-friendly purifying method for removing various kinds of wastes and impurities from river water and rain water to recycle or cleanly treat river water and rain water and point pollutant source and non-point pollutant source purifying system for storing and purifying river water and rain water using the same".

Document 2. Korean Patent No. 10-1389570, Korean Intellectual Property Office, entitled "point pollutant source and non-point pollutant source purifying apparatus for reversely collecting and purifying stream water and pollutants flowing from point pollutant source and non-point pollutant source around reservoir, lake, lagoon, or dam".

SUMMARY OF THE INVENTION

The present invention provides a non-point pollutant source treatment apparatus, which can smoothly treat initial polluted rain water, in which various materials deposited on bridges, underground roadways and roads, and pollutants generated from vehicles or nature are mixed with rain water, without clogging of the treatment apparatus by foreign substances filtered during a treatment process.

Embodiments of the present invention provide non-point pollutant source treatment apparatuses including: an inlet pipe allowing initial polluted rain water (i.e., raw water) to flow therethrough; a settling tank coupled to a lower portion of the inlet pipe and storing raw water flowing from the inlet pipe; a drain part disposed at one side of an inside of the settling tank directly under the inlet pipe and coupled to a drain pipe connected to an outlet pipe so as to discharge raw water contained in the settling tank into the outlet pipe; a purifying member disposed at the other side of the inside of the settling tank and including purifying plates arranged in horizontal and vertical directions, the purifying plates having inlet holes to filter foreign substances from raw water; a filtering part coupled to an upper portion of the settling tank directly over the purifying member and filtering foreign substances from raw water; and a backwashing tank coupled to an upper portion of the filtering part and including a purified water pipe disposed at an upper portion of one side thereof and connected to the outlet pipe.

In some embodiments, one of vertical purifying plates of the purifying member, which is disposed at the side of the drain part, may be formed higher than other vertical purifying plates by a certain height.

In other embodiments, the filtering part may include a first filtering tank filled with a foam filter medium and a second filtering tank coupled to an upper portion of the first filtering tank and filled with activated carbon therein.

In still other embodiments, the non-point pollutant source treatment apparatus may include filtering panels disposed at lower portions of the first filtering tank and the second filtering tank to filter foreign substances.

In even other embodiments, the filtering panels may include wedge bars longitudinally formed in a triangular cross-sectional shape, spaced from each other at intervals of about 0.5 mm to about 0.7 mm, and fixedly coupled to each other by a fixing bar such that slits are formed between the wedge bars adjacent to each other, and the slit may increasingly widen from a lower portion to an upper portion thereof.

In yet other embodiments, the non-point pollutant source treatment apparatus may further include a clogging preventing part disposed under the first filtering tank and preventing clogging by removing foreign substances from the filtering panel. Here, the clogging preventing part may include a floating body and a brush disposed on a top surface of the floating body to wash the filtering panel at the lower portion of the first filtering tank by floating according to a level of raw water of the settling tank.

In further embodiments, the non-point pollutant source treatment apparatus may further include wash pipes disposed over the filtering panels of the first filtering tank and the second filtering tank and including nozzles downwardly injecting wash water or compressed air.

In still further embodiments, the non-point pollutant source treatment apparatus may further include wash pipes disposed over the foam filter medium and the activated carbon which are filled in the first filtering tank and the second filtering tank, respectively, and including nozzles downwardly injecting wash water or compressed air.

In even further embodiments, the drain part may include a certain number of strainers having a short cylindrical shape and having filtering slits that are radially formed and communicate an inside and an outside of the strainer, and the filtering slit may have a width of about 0.5 mm, which increasingly widens from the outside to the inside of the strainer.

In yet further embodiments, the non-point pollutant source treatment apparatus may include an adsorption part disposed in the inlet pipe to adsorb oil. Here, the adsorption part may include a support frame including a flange part at an upper end thereof and an adsorption fabric having a tubular shape and disposed in the support flame such that an upper end portion thereof is hung on the flange part, and the adsorption fabric may increasingly narrow from a top to a bottom thereof.

In much further embodiments, the settling tank, the filtering tank, and the backwashing tank may be coupled to each other by a flange structure.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Figure 1:
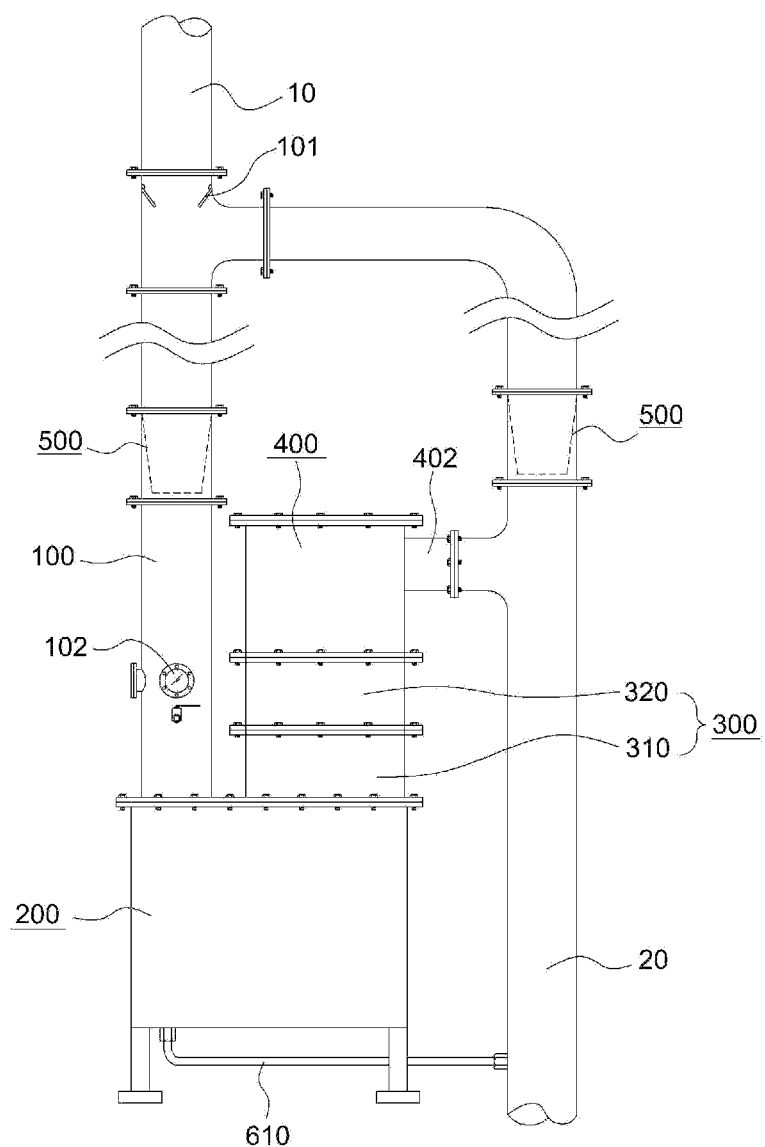
FIG. 1 is a view illustrating a non-point pollutant source treatment apparatus according to an embodiment of the present invention.
Figure 2:
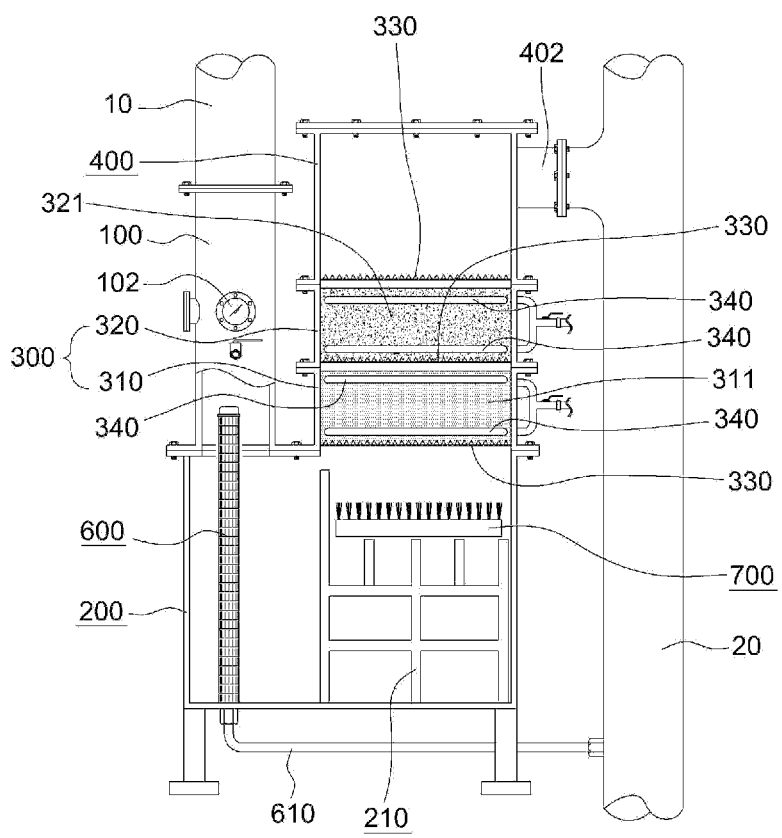
FIG. 2 is a view illustrating a configuration of a non-point pollutant source treatment apparatus according to an embodiment of the present invention.

FIGS. 1 and 2 are views illustrating a non-point pollutant source treatment apparatus according to an embodiment of the present invention. The non-point pollutant source treatment apparatus may include an inlet pipe 100 for receiving raw water containing pollutants, a settling tank 200 holding raw water introduced through the inlet pipe 100 and filtering foreign substances of raw water, a filtering part for filtering pollutants from raw water from which foreign substances are filtered by the settling tank 200, a backwashing tank 400 for backwashing the filtering part 300, and a purified water pipe 402 discharging purified rain water into an outlet pipe 20.

A flow control plate 101 may be disposed on an upper portion (over a branch point of the outlet pipe 20) of the inlet pipe 100 of the non-point pollutant source treatment apparatus. The flow control plate 101 may be obliquely disposed so as to downwardly incline toward the central portion of the inlet pipe 100. Thus, in case of rain, raw water containing foreign substances and pollutants of a road may not be discharged into the outlet pipe 20, and may flow into the settling tank 200 through the inlet pipe 100.

The flow control plate 101 may be connected to a collecting pipe 10 and the outlet pipe 20 so as to allow initial raw water flowing into the collecting pipe 10 to be transferred into the inlet pipe 100 of the non-point pollutant source treatment apparatus.

Initial polluted rain water may contain highly concentrated pollutants. Initial polluted rain water may be guided to the inlet pipe 100 of the non-point pollutant source treatment apparatus through the flow control plate 101 for the treatment of pollutants. A large amount of rain water compared to the filtering speed may be accumulated in the inlet pipe 100, and the level of rain water may keep rising. Once the water level rises up to a connection part between the collecting pipe 10 and the outlet pipe 20, raw water may be naturally discharged through the outlet pipe 20.

Also, a sight glass 102 may be installed in the inlet pipe 100 to allow a user to inspect the internal state from the outside, and a valve may be installed in the inlet pipe 100 to allow a user to easily take a sample of raw water flowing into the non-point pollutant source treatment apparatus.

Through the inlet pipe 100, raw water including highly-concentrated foreign substances and pollutants may flow into the settling tank 200.

A drain part 600 may be disposed at one side of the inside of the settling tank 200 under the inlet pipe 100. The drain part 600 may be connected to the drain pipe 610 outside the settling tank 200, and may communicate with the outlet pipe 20.

Figure 4:
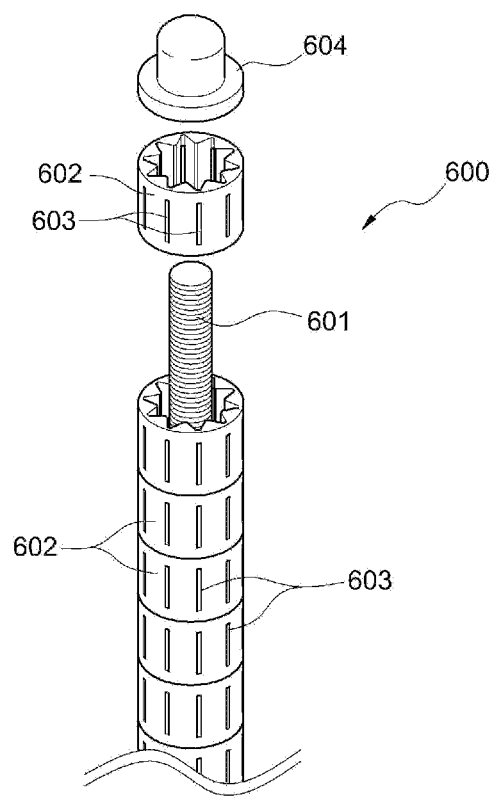
FIG. 4 is a perspective view illustrating a drain part of a non-point pollutant source treatment apparatus according to an embodiment of the present invention.

As shown in FIG. 4, the drain part 600 may include a plurality of strainers 602 stacked. The strainer 602 may have a short cylindrical shape that has upper and lower portions opened. The strainer 602 may have vertical filtering slits 603 radially formed in the outer surface thereof.

The filtering slit 603 may have a width of about 0.5 mm such that only a certain amount of raw water can be drained through the drain pipe 610 even though much raw water is introduced, and such that foreign substances such as floating matters and sands having a certain size can be filtered.

When the width of the filtering slit 603 is greater than 0.5 mm, the outflow of untreated initial raw water through the drain part 600 may increase. Accordingly, it is preferable that the filtering slit 603 is formed to have a width of about 0.5 mm.

The filtering slit 603 may allow the inside and the outside of the strainer 602 to communicate with each other. As shown in FIG. 4, the filtering slit 603 may increasingly widen from the outside to the inside such that the clogging of the filtering slit 603 can be reduced.

A support 601 may be vertically disposed inside the settling tank 200 under the inlet pipe 100 such that the strainers 602 formed as described above may be stacked while covering the support 602.

As shown in FIG. 2, the drain part 600 may be formed to have a height higher than the settling tank 200 such that rain water can be drained even when the settling tank 200 is filled with sludge. Thus, the sludge inside the settling tank 200 can be prevented from decaying.

The drain part 600 may be provided to prevent raw water flowing into the settling tank 200 through the inlet pipe 100 from decaying. Foreign substances of a portion of raw water introduced into the settling tank 200 may be filtered by the drain part 600, and raw water that is filtered may be drained into the outlet pipe 20 through the drain pipe 610 communicating with the inside of the drain part 600 under the settling tank 200. Thus, raw water introduced into the drain part 600 may be allowed not to stay in the settling tank 200 for a long time, preventing raw water from decaying and maintaining a uniform water level even though raw water is excessively introduced into the settling tank 200.

Also, when the inflow of raw water is absent, raw water may stagnate in the settling tank 200. In this case, raw water may be allowed not to remain in the settling tank 200 by discharging raw water into the outlet pipe 20 through the drain part 600 and the drain pipe 610.

A purifying member 210 may be disposed at the other side of the inside of the settling tank 200 in which the drain part 600 is disposed.

Figure 3:
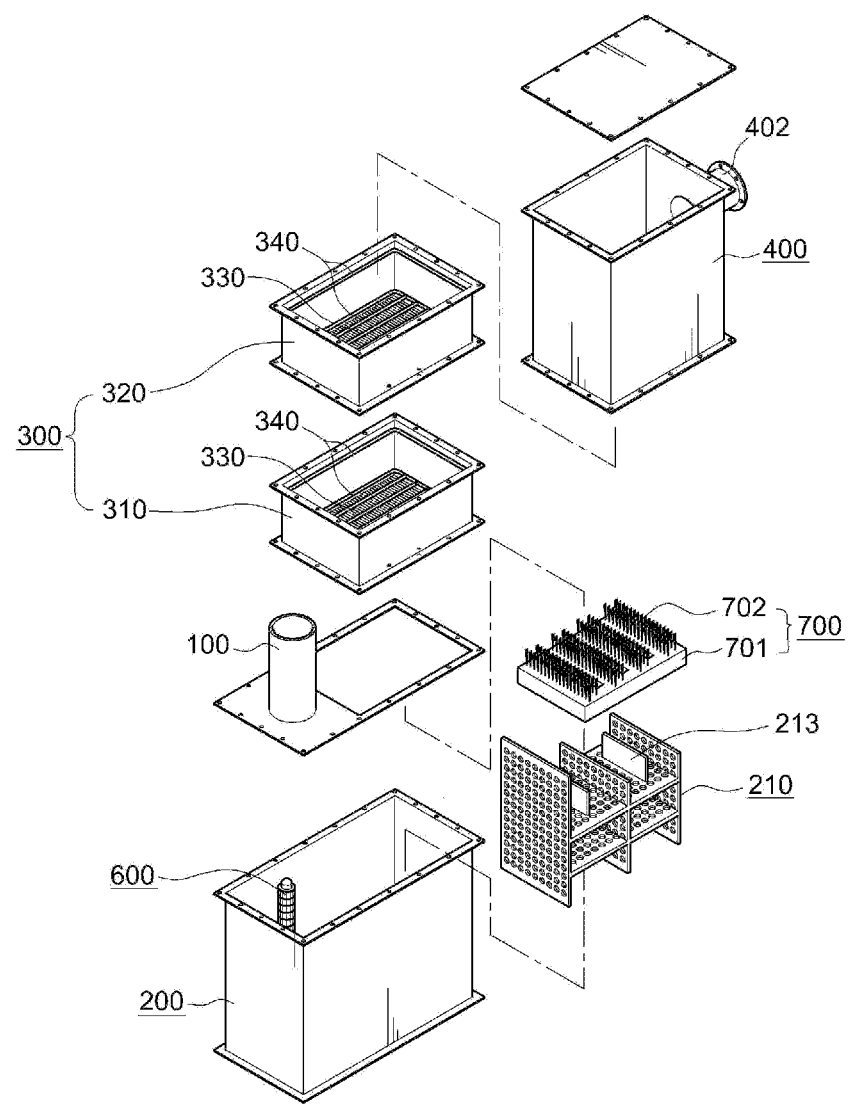
FIG. 3 is an exploded perspective view illustrating a non-point pollutant source treatment apparatus according to an embodiment of the present invention.
Figure 5:
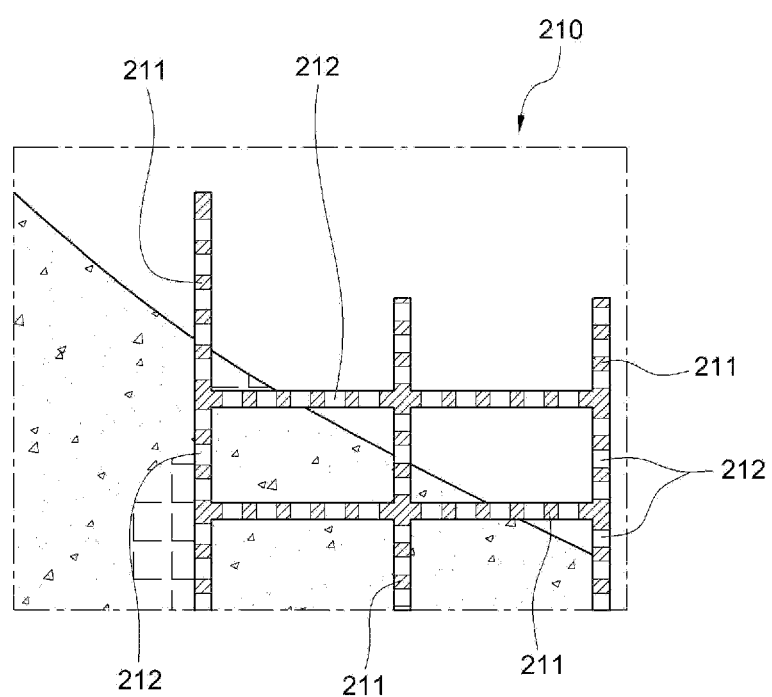
FIG. 5 is a view illustrating a purifying member of a non-point pollutant source treatment apparatus filtering foreign substances.

The purifying member 210 may be disposed to filter foreign substances from raw water before raw water introduced through the inlet pipe 100 reaches the filtering part 300. As shown in FIGS. 2, 3, and 5, the purifying member 210 may be disposed in the settling tank 200, and may include purifying plates 211 that are arranged in vertical and horizontal directions such that the cross-section thereof becomes a lattice shape. The purifying plate 211 may have inlet holes 212 formed by perforating the surface thereof.

The purifying member 210 may be installed in the settling tank 200 to allow various kinds of foreign substances included in raw water to pass through the inlet holes 212 of the purifying member 210 and thus allow sludge to deposit under the purifying member 210. Raw water passing through the inlet holes 212 of the purifying member 210 may flow to the filtering part 300 at a uniform speed.

In this case, as shown in FIG. 5, a vertical purifying plate 211 of the purifying member 210 disposed at the side (at the side of inflow of raw water) of the drain part 600 may be formed to have a height greater than the height of other vertical purifying plates 211.

Raw water flowing into the settling tank 200 through the inlet pipe 100 may have a flow type of a turbulent flow. While raw water is passing through the inlet holes 212 of the purifying plate 211, raw water may be changed into a flow type of a laminar flow, and then the filtering speed may be induced to be identical.

Also, when the vertical purifying plate 211 at the side of the inflow of raw water is formed to a height greater than the height of the other vertical purifying plates 211, the filtering speed of raw water may be maintained uniform, and as shown in FIG. 5, foreign substances included in raw water may be deposited at a lateral direction of the purifying member 210 by the vertical purifying plate 211 having the greatest height.

As described above, the purifying member 210 may filter foreign substances from raw water of the settling tank 200, and then may supply raw water to the filtering part 300 disposed over the settling tank 200. Foreign substances filtered by the purifying member 210 may be deposited at a lateral direction of the purifying member 210, and foreign substances may be prevented from depositing under the filtering part 300. Thus, the inlet of the filtering part 300 may be prevented from being blocked, and a space for rising and falling of a clogging preventing part 700 may be secured.

Since the purifying member 210 may be disposed in the settling tank without a coupling member as shown in FIG. 3, the inside of the settling tank can be conveniently cleaned by disassembling a cover of the settling tank 200 having a flange structure.

Raw water of the settling tank 200 may be supplied to the filtering part 300 over the settling tank 200 by a pressure of raw water that is continuously supplied through the inlet pipe 100 at a uniform speed due to the purifying member 210.

In this embodiment, the filtering part 300 may include a first filtering tank 310 and a second filtering tank 320.

As shown in FIGS. 2 and 3, the first filtering tank 310 and the second filtering tank 320 including an upper portion opened and a filtering panel 330 at a lower portion thereof may be coupled to each other in a flange structure to form the filtering part 300. The filtering part 300 may be coupled to an upper portion of the settling tank 200 in a flange structure.

The first filtering tank 310 may be filled with a foam filter medium 311, and the second filtering tank 320 may be filled with an activated carbon 321.

Raw water from which foreign substances are filtered by the purifying member 210 may flow to the first filtering tank 310 through the lower portion of the first filtering tank 310. In this case, small-sized foreign substances included in raw water may be filtered by the filtering panel 330 disposed at the lower portion of the first filtering tank 310, and raw water may flow into the first filtering tank 310.

The foam filter medium 311 filled in the first filtering tank 310 may include expanded polypropylene (EPP) or expanded polystyrene (EPS) that is foamed so as to have a diameter of about 2 mm to about 4 mm. The foam filter medium 311 may reduce Biological Oxygen Demand (BOD) of raw water and remove phosphorus from raw water.

Raw water filtered in the first filtering tank 310 to reduce BOD and remove phosphorus may flow into the second filtering tank 320 through the filtering panel 330 disposed at the lower portion of the second filtering tank 320.

The activated carbon 321 filled in the second filtering tank 320 may be produced by treating and drying wood, brown coal, and peat coal with chemicals such as zinc chloride or phosphoric acid which is an activation agent or activating charcoal with vapor. The activated carbon 321 may improve the reliability of the removal of pollutants by secondarily filtering BOD ingredients and phosphorus remaining in raw water introduced into the second filtering tank 320.

Figure 7:
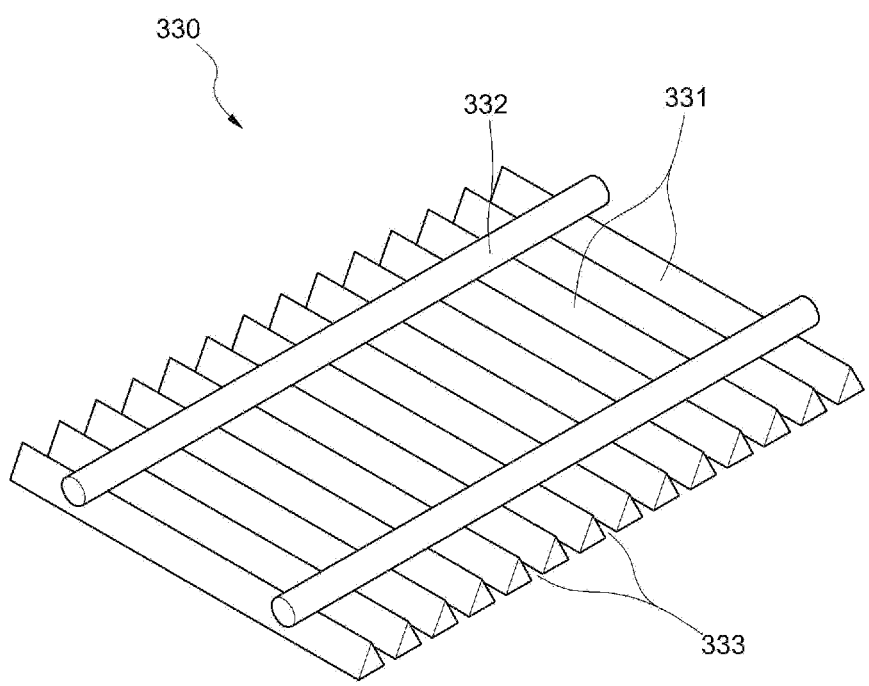
FIG. 7 is a perspective view illustrating a filtering panel of a filtering part.

As shown in FIG. 7, the filtering panels 330 disposed at the lower portions of the first filtering tank 310 and the second filtering tank 320 may include wedge bars 331 that are continuously arranged at intervals of about 0.5 mm to about 0.7 mm and have a triangular section. A slit 333 may be formed between the wedge bars 331 adjacent to each other. The wedge bars 331 may be fixedly coupled to each other by a fixing bar 332.

As described above, since the wedge bars 331 having a triangular cross-sectional shape, the slit 333 may increasingly widen from a lower portion to an upper portion thereof, forming an inverted triangular shape.

Accordingly, when raw water upwardly flows through the filtering panel 330, foreign substances such as floating materials or sands may be filtered by the fine slits 333 between the wedge bars 331, allowing only raw water to flow into the first filtering tank 310 and the second filtering tank 320. Also, when raw water contained in the backwashing tank 400 described later downwardly flows for backwashing, foreign substances of the filtering panel 330 can be easily detached and removed by the slits 333 formed in a triangular shape. The backwashing process of the backwashing tank 400 will be described in detail later.

Raw water introduced into the second filtering tank 320 may be again filtered by the activated carbon 321 for the removal of BOD ingredients and phosphorus, and then may be supplied into the backwashing tank 400.

As shown in FIGS. 2 and 3, the upper portion of the backwashing tank 400 may be sealed by a cover, and a filtering panel 330 may be disposed at a lower portion thereof. The backwashing tank 400 may be coupled to the filtering part by a flange structure. The purified water pipe 402 may be disposed at an upper portion of one side of the backwashing tank 400, and may be connected to the outlet pipe 20.

When raw water is supplied from the filtering part 300, foreign substances may be filtered by the filtering panel 330, and raw water may be filled in the backwashing tank 400. In this case, when the level of raw water reaches the height of the purified water pipe 402, purified raw water in the backwashing tank 400 may be discharged into the outlet pipe 20 through the purified water pipe 402.

When the supply of raw water from the inlet pipe 100 is stopped, due to the discharge of raw water through the drain part 600 of the settling tank 200, purified raw water remaining in the backwashing tank 400 may drop into the settling tank 200 through the filtering part 300 by gravity. In this process, rain water of the backwashing tank 400 may wash the filtering part 300 by flowing into the settling tank 200 together with foreign substances deposited on the filtering panel 330 of the backwashing tank 400, the activated carbon 321 and the filtering panel 330 of the second filtering tank 320, and the foam filter medium 311 and the filtering panel 330 of the first filtering tank 310.

As shown in FIGS. 2 and 3, wash pipes 340 having nozzles (not shown) may be disposed at upper and lower portions of the first filtering tank 310 and the second filtering tank 320.

The wash pipe 340 may remove foreign substances deposited between particles of the foam filter medium 311 and the activated carbon 321 that are filled in the first filtering tank 310 and the second filtering tank 320, respectively, and may remove foreign substances stuck in the slits 333 of the filtering panels 330 disposed at the lower portions of the first filtering tank 310 and the second filtering tank 320.

Figure 6:
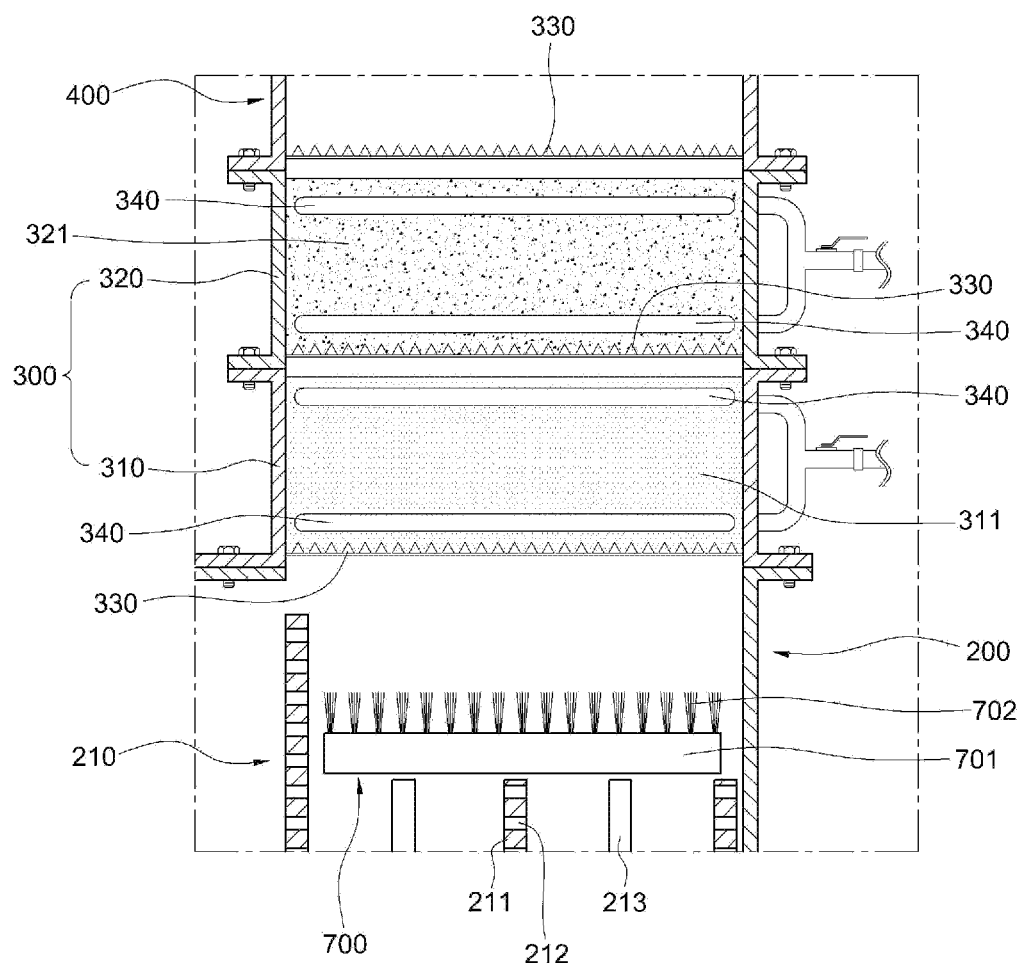
FIG. 6 is a view illustrating a filtering part and a clogging preventing part of a non-point pollutant source treatment apparatus.
Figure 8:
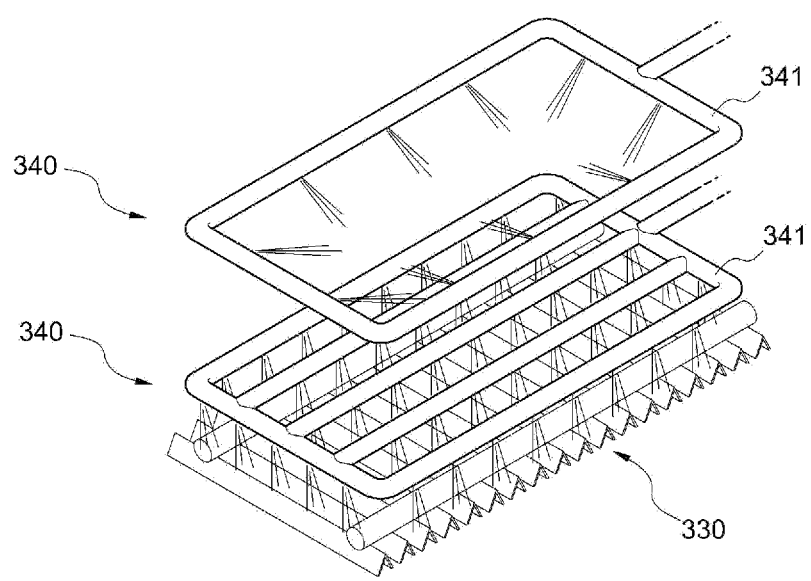
FIG. 8 is a perspective view illustrating a cleansing pipe of a filtering part.
Figure 9:
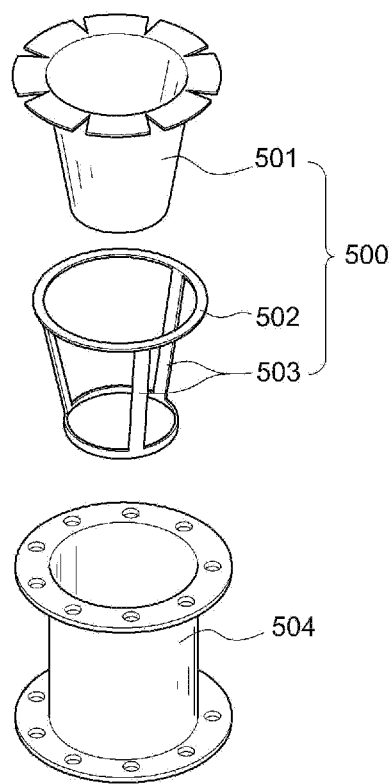
FIG. 9 is an exploded perspective view illustrating an adsorbing member of a non-point pollutant source treatment apparatus.

As shown in FIG. 6, high-pressure wash water or compressed air may be supplied from the outside of the filtering part 300 into the wash pipe 340, and as shown in FIG. 8, wash water and compressed air may be injected from nozzles downwardly disposed on the wash pipe, such that foreign substances deposited in the foam filter medium 311 and the activated carbon 321 and foreign substances of the filtering panel 330 are removed.

That is, the wash pipe 340 at the upper side may remove foreign substances deposited in the foam filter medium 311 and the activated carbon 321, and the wash pipe 340 at the lower side may wash the filtering panel 330.

As shown in FIGS. 2 and 3, the clogging preventing part 700 may be disposed on the purifying member 210. As shown in FIG. 3, the clogging preventing part 700 may include a floating body 701 formed of a material such as polyethylene (PE) and a brush 702 disposed on the top surface of the floating body 701 and having a thickness of about 0.2 mm to about 0.3 mm and a length of about 7 mm.

The clogging preventing part 700 may remove foreign substances stuck in the filtering panel 330 at the lower portion of the first filtering tank 310 so as to prevent the inlet of the filtering part 300 from clogging.

When the level of raw water rises in the settling tank 220, the floating body 701 of the clogging preventing part 700 may float. While the floating body 701 is floating, the brush 702 on the top surface of the floating body 701 may wash the filtering panel 330 at the lower portion of the first filtering tank 310 so as to remove foreign substances.

When the water level of the settling tank 200 is lowered, the clogging preventing part 700 may be placed on the purifying member 210. In this case, a brush support 213 may be disposed on the purifying member 210 to allow the clogging preventing part 700 to be placed on the purifying member in a horizontal state as shown in FIG. 3.

Also, as shown in FIG. 1, adsorption parts 500 may be disposed to adsorb oil in the inlet pipe 100 and the adsorption part.

The width of the adsorption part 500 may increasingly narrow from the top to the bottom thereof. The adsorption part 500 may include a support frame 503 including a flange part 502 at the top thereof, and an adsorption fabric 501 that is disposed in the support frame 503 with a tubular shape while being hung on the flange part 502.

The adsorption parts 500 may be disposed through the connection pipe in the inlet pipe 100 and the outlet pipe 20, enabling convenient maintenance and repair by disassembling the connection pipe 105 for maintenance and repair.

The reason why the adsorption part 500 is formed to increasingly narrow from the top to the bottom may be to allow oil to be sufficiently adsorbed and removed by the adsorption fabric 501 by increasingly gathering rain water in the center and decelerating the flow speed.

Figure 10:
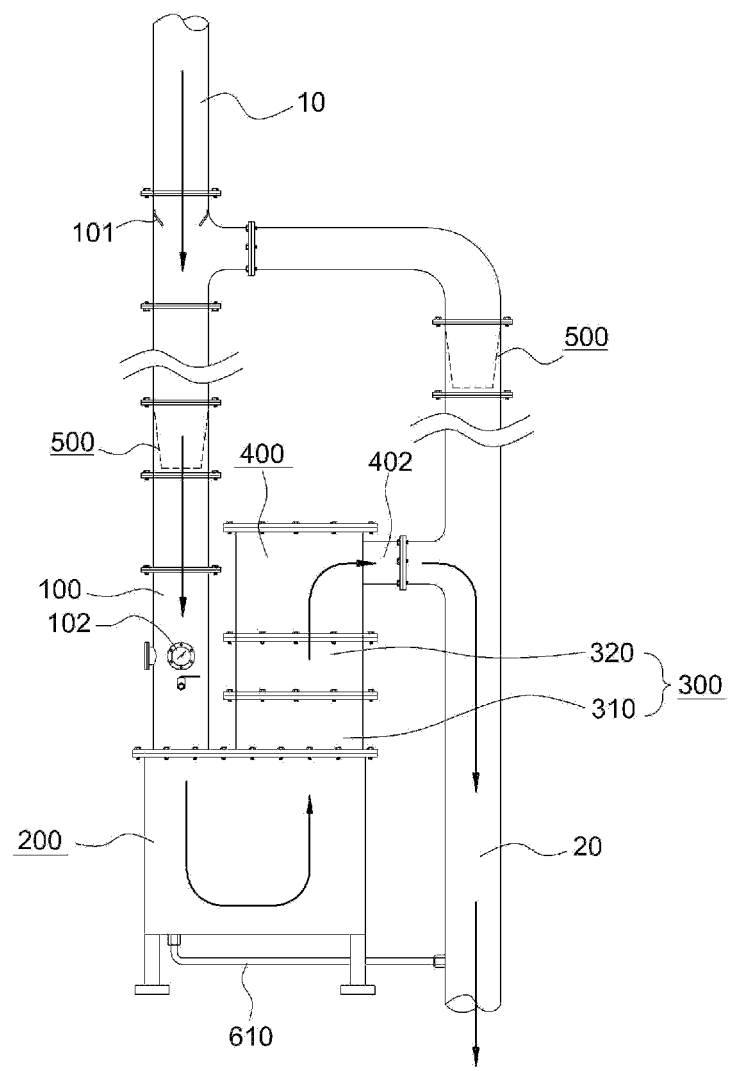
FIG. 10 is a view illustrating a flow of initial polluted rain water of a non-point pollutant source treatment apparatus.

When it is rainy, as shown in FIG. 10, initial highly-concentrated raw water contained with foreign substances and various kinds of pollutants deposited on roads may not flow into the outlet pipe 20, and may flow into the inlet pipe 100 by the flow control plate 101. In this case, oil components contained in initial raw water may be adsorbed and removed by the adsorption part 500.

Raw water may flow to one side of the settling tank 200 through the inlet pipe 100, and then may flow to the other of the settling tank 200, allowing large-sized foreign substances to be filtered by the purifying member 210. Raw water flowing at a uniform filtration rate due to the pressure of continuous inflow of raw water may upwardly flow into the filtering part 300 through the purifying member 210.

While raw water upwardly flows into the first filtering tank 310 of the filtering part 300, foreign substances may be filtered by the filtering panel 300 disposed at the lower portion of the first filtering tank, and then pollutants such as BOD ingredients and phosphorus may be removed by the foam filter medium 311 filled in the first filtering tank 310. Thereafter, while upwardly flowing into the second filtering tank 320, raw water may pass through the filtering panel 330 disposed at the lower portion of the second filtering tank, and then BOD ingredients and phosphorus remaining in raw water may be removed the activated carbon 321 filled in the foam filter medium 320.

Thereafter, raw water may upwardly flow into the backwashing tank 400 disposed over the second filtering tank 320, increasing the water level of the backwashing tank. When the water level of the backwashing tank reaches the purified water pipe, raw water may be discharged into the outlet pipe 20 through the purified water pipe 402.

Figure 11:
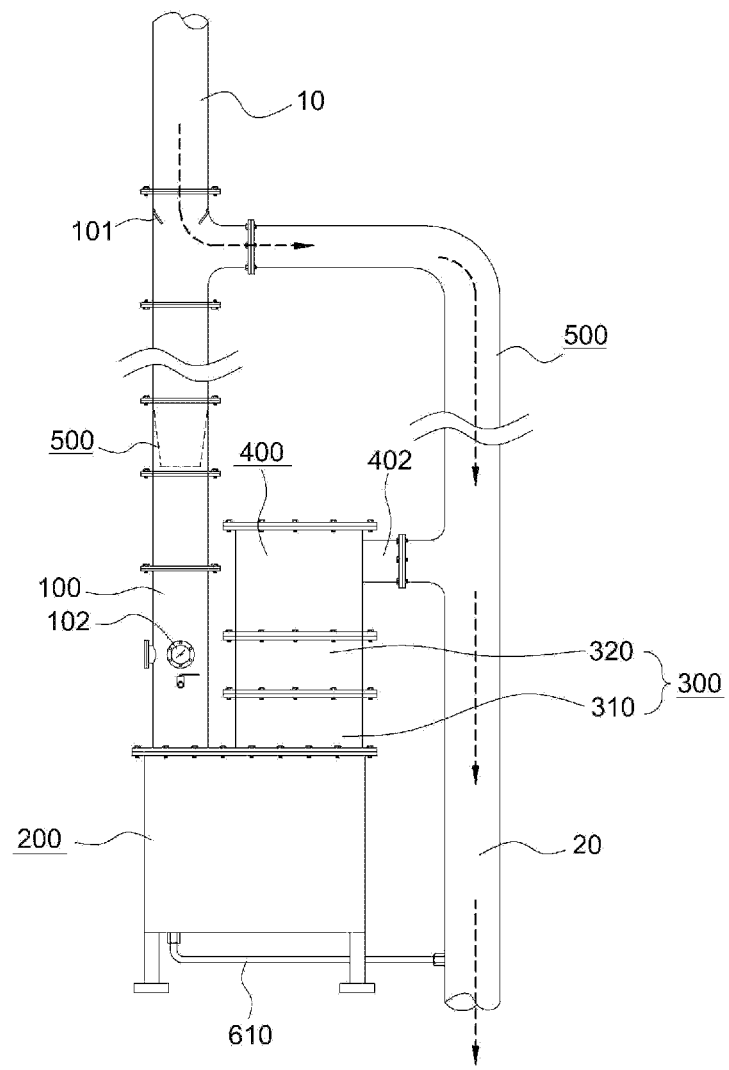
FIG. 11 is a view illustrating a flow of general rain water of a non-point pollutant source treatment apparatus.

When the amount of raw water flowing into the inlet pipe exceeds the treatment capacity of the point pollutant source treatment apparatus, as shown in FIG. 11, raw water may be directly discharged into the outlet pipe 20.

When the rain stops and the inflow of raw water stops, raw water (purified rain water) contained in the backwashing tank 400 may downwardly flow into the settling tank 200 by gravity. Raw water flowing into the settling tank 200 may wash the first filtering tank 310 and the second filtering tank 320, and then may be discharged into the drain pipe 610 through the drain part 600.

According to the embodiments, the non-point pollutant source treatment apparatus can effectively treat initial polluted rain water including various materials deposited on bridges, underground roadways and roads, and pollutants such as BOD ingredients and phosphorus generated from vehicles or nature, and can smoothly purify the initial polluted rain water without clogging of the treatment apparatus by foreign substances filtered during the treatment process.

Also, the internal filtering tank can be washed without disassembling, and since components are coupled to each other by a flange structure, it is very easy to disassemble the components when parts are changed or foreign substances deposited therein are discharged.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-point pollutant source treatment apparatus comprising:
    an inlet pipe allowing initial polluted rain water (i.e., raw water) to flow therethrough;
    a settling tank coupled to a lower portion of the inlet pipe and storing raw water flowing from the inlet pipe;
    a drain part disposed at one side of an inside of the settling tank directly under the inlet pipe and coupled to a drain pipe connected to an outlet pipe so as to discharge raw water contained in the settling tank into the outlet pipe;
    a purifying member disposed at the other side of the inside of the settling tank and comprising purifying plates arranged in horizontal and vertical directions, the purifying plates having inlet holes to filter foreign substances from raw water;
    a filtering part coupled to an upper portion of the settling tank directly over the purifying member and filtering foreign substances from raw water; and
    a backwashing tank coupled to an upper portion of the filtering part and comprising a purified water pipe disposed at an upper portion of one side thereof and connected to the outlet pipe.

2. The non-point pollutant source treatment apparatus of claim 1, wherein one of vertical purifying plates of the purifying member, which is disposed at the side of the drain part, is formed higher than other vertical purifying plates by a certain height.

3. The non-point pollutant source treatment apparatus of claim 1, wherein the filtering part comprises a first filtering tank filled with a foam filter medium and a second filtering tank coupled to an upper portion of the first filtering tank and filled with activated carbon therein.

4. The non-point pollutant source treatment apparatus of claim 3, comprising filtering panels disposed at lower portions of the first filtering tank and the second filtering tank to filter foreign substances.

5. The non-point pollutant source treatment apparatus of claim 4, wherein the filtering panels comprise wedge bars longitudinally formed in a triangular cross-sectional shape, spaced from each other at intervals of about 0.5 mm to about 0.7 mm, and fixedly coupled to each other by a fixing bar such that slits are formed between the wedge bars adjacent to each other, and
    the slit increasingly widens from a lower portion to an upper portion thereof.

6. The non-point pollutant source treatment apparatus of claim 4, further comprising a clogging preventing part disposed under the first filtering tank and preventing clogging by removing foreign substances from the filtering panel,
    wherein the clogging preventing part comprises a floating body and a brush disposed on a top surface of the floating body to wash the filtering panel at the lower portion of the first filtering tank by floating according to a level of raw water of the settling tank.

7. The non-point pollutant source treatment apparatus of claim 4, further comprising wash pipes disposed over the filtering panels of the first filtering tank and the second filtering tank and comprising nozzles downwardly injecting wash water or compressed air.

8. The non-point pollutant source treatment apparatus of claim 4, further comprising wash pipes disposed over the foam filter medium and the activated carbon which are filled in the first filtering tank and the second filtering tank, respectively, and comprising nozzles downwardly injecting wash water or compressed air.

9. The non-point pollutant source treatment apparatus of claim 7, further comprising wash pipes disposed over the foam filter medium and the activated carbon which are filled in the first filtering tank and the second filtering tank, respectively, and comprising nozzles downwardly injecting wash water or compressed air.

10. The non-point pollutant source treatment apparatus of claim 1, wherein the drain part comprises a certain number of strainers having a short cylindrical shape and having filtering slits that are radially formed and communicate an inside and an outside of the strainer, and
    the filtering slit has a width of about 0.5 mm, which increasingly widens from the outside to the inside of the strainer.

11. The non-point pollutant source treatment apparatus of claim 1, comprising an adsorption part disposed in the inlet pipe to adsorb oil,
    wherein the adsorption part comprises a support frame comprising a flange part at an upper end thereof and an adsorption fabric having a tubular shape and disposed in the support flame such that an upper end portion thereof is hung on the flange part, and the adsorption fabric increasingly narrows from a top to a bottom thereof.

12. The non-point pollutant source treatment apparatus of claim 1, wherein the settling tank, the filtering tank, and the backwashing tank are coupled to each other by a flange structure.

* * * * *